United States Patent
Lim et al.

(10) Patent No.: US 11,614,323 B2
(45) Date of Patent: Mar. 28, 2023

(54) METHOD OF PREDICTING GRAVITY-FREE SHAPE OF GLASS SHEET AND METHOD OF MANAGING QUALITY OF GLASS SHEET BASED ON GRAVITY-FREE SHAPE

(71) Applicant: Corning Incorporated, Corning, NY (US)

(72) Inventors: Sang-ho Lim, Seongnam (KR); Myunghwan Oh, Yongin-si (KR)

(73) Assignee: Corning Incorporated, Corning, NY (US)

( * ) Notice: Subject to any disclaimer, the term of this patent is extended or adjusted under 35 U.S.C. 154(b) by 1135 days.

(21) Appl. No.: 16/302,966

(22) PCT Filed: May 23, 2017

(86) PCT No.: PCT/KR2017/005342
§ 371 (c)(1),
(2) Date: Nov. 19, 2018

(87) PCT Pub. No.: WO2017/204528
PCT Pub. Date: Nov. 30, 2017

(65) Prior Publication Data
US 2019/0120613 A1    Apr. 25, 2019

(30) Foreign Application Priority Data
May 23, 2016    (KR) .......................... 10-2016-0063048

(51) Int. Cl.
*G01B 11/16*    (2006.01)
*C03B 17/06*    (2006.01)
(Continued)

(52) U.S. Cl.
CPC .......... *G01B 11/168* (2013.01); *C03B 17/064* (2013.01); *G01B 9/08* (2013.01);
(Continued)

(58) Field of Classification Search
CPC ........ G01B 11/168; G01B 9/08; G01B 11/24; G01B 11/245; G01B 11/26; G01B 21/20;
(Continued)

(56) References Cited

U.S. PATENT DOCUMENTS 3,737,665 A * 6/1973 Nagae .................. G01N 21/896
250/559.48
4,207,000 A * 6/1980 Miller .................. G01B 11/168
356/73.1
(Continued)

FOREIGN PATENT DOCUMENTS

CN    101542228 A    9/2009
CN    102007370 A    4/2011
(Continued)

OTHER PUBLICATIONS

Baran et al., "A Review on the Mechanical Modeling of Composite Manufacturing Processes", Arch Computat Methods Eng (2017) 24:365-395.*
(Continued)

*Primary Examiner* — Mohamed K Amara
(74) *Attorney, Agent, or Firm* — Matthew J. Mason

(57) ABSTRACT

A method of predicting the gravity-free shape of a glass sheet and a method of managing the quality of a glass sheet based on the gravity-free shape of the glass sheet. The initial shape of a glass sheet is determined. When the glass sheet is flattened, values of stress at a plurality of locations in the glass sheet are obtained. A shape that the glass sheet will have when the flattened glass sheet is deformed such that the values of stress are zero is predicted as a stress-induced shape and a gravity-free shape of the glass sheet is predicted by combining the initial shape and the stress-induced shape. Quality management is performed on glass sheets based on
(Continued)

1mm Bow(U-shape)
Initial Shape

Stress Measurement present disclosure
(modeling)

conventional
(measured)

gravity-free shapes thereof predicted using the method of predicting the gravity-free shape of a glass sheet.

8 Claims, 10 Drawing Sheets

(51) Int. Cl.
| | |
|---|---|
| G01B 21/20 | (2006.01) |
| G01B 11/245 | (2006.01) |
| G01B 9/08 | (2006.01) |
| G01B 11/24 | (2006.01) |
| G01B 11/26 | (2006.01) |
| G01L 1/24 | (2006.01) |
| C03B 18/02 | (2006.01) |
| G01N 21/896 | (2006.01) |

(52) U.S. Cl.
CPC ............ *G01B 11/24* (2013.01); *G01B 11/245* (2013.01); *G01B 11/26* (2013.01); *G01B 21/20* (2013.01); *G01L 1/24* (2013.01); *C03B 18/02* (2013.01); *G01N 21/896* (2013.01)

(58) Field of Classification Search
CPC ....... C03B 17/064; C03B 18/02; C03B 17/06; G01L 1/24; G01N 21/896
See application file for complete search history.

(56) References Cited

U.S. PATENT DOCUMENTS

| | | | | |
|---|---|---|---|---|
| 4,492,477 A * | 1/1985 | Leser | ............ | G01N 21/958 356/239.8 |
| 6,011,620 A * | 1/2000 | Sites | ............ | G01N 21/896 356/430 |
| 6,758,064 B1 * | 7/2004 | Kariya | ............ | C03B 17/06 65/95 |
| 7,292,332 B2 * | 11/2007 | Gerstner | ............ | G01N 21/896 356/239.1 |
| 7,345,698 B2 * | 3/2008 | Abbott | ............ | G01N 21/896 348/86 |
| 7,369,240 B1 * | 5/2008 | Abbott | ............ | G01N 21/896 356/429 |
| 7,418,677 B2 * | 8/2008 | Sawai | ............ | B60R 16/0215 716/136 |
| 7,509,218 B2 * | 3/2009 | Hoysan | ............ | G01B 7/287 702/41 |
| 7,551,274 B1 * | 6/2009 | Wornson | ............ | G01N 21/896 356/429 |
| 7,567,344 B2 * | 7/2009 | LeBlanc | ............ | G01N 21/896 356/239.8 |
| 7,984,625 B2 * | 7/2011 | Markham | ............ | C03B 17/067 65/95 |
| 8,072,593 B2 * | 12/2011 | Brittain | ............ | G01N 21/896 356/239.7 |
| 8,210,001 B2 * | 7/2012 | Allan | ............ | C03B 17/067 65/29.12 |
| 8,242,477 B2 * | 8/2012 | Lopatin | ............ | G01N 21/896 250/559.46 |
| 8,459,062 B2 * | 6/2013 | Ahrens | ............ | C03B 17/064 65/195 |
| 8,528,365 B2 * | 9/2013 | Delia | ............ | C03B 17/064 65/157 |
| 8,794,036 B2 * | 8/2014 | Markham | ............ | C03B 17/06 65/97 |
| 9,010,148 B2 * | 4/2015 | Contreras | ............ | G01N 21/23 65/29.12 |
| 9,031,813 B2 * | 5/2015 | Abbott, III | ............ | G01B 11/0608 702/155 |
| 9,110,035 B2 * | 8/2015 | Zheng | ............ | G06K 9/00 |
| 9,950,476 B2 * | 4/2018 | Nguyen | ............ | G06F 30/23 |
| 10,267,750 B2 * | 4/2019 | Vild | ............ | G01N 21/8806 |
| 11,130,697 B2 * | 9/2021 | Oh | ............ | C03B 17/064 |
| 2006/0016219 A1 * | 1/2006 | Pitbladdo | ............ | G01F 1/6888 65/29.21 |
| 2006/0020434 A1 * | 1/2006 | Sawai | ............ | B60R 16/0215 703/2 |
| 2006/0081009 A1 * | 4/2006 | Maldonado | ............ | C03B 17/064 65/195 |
| 2008/0062422 A1 * | 3/2008 | Thomas | ............ | G01N 21/896 356/432 |
| 2008/0066498 A1 * | 3/2008 | Markham | ............ | C03B 17/064 65/29.16 |
| 2009/0120134 A1 * | 5/2009 | Chen | ............ | G01B 11/245 356/602 |
| 2010/0051817 A1 * | 3/2010 | An | ............ | C03B 17/064 250/365 |
| 2010/0220369 A1 * | 9/2010 | Knuttel | ............ | G01B 11/007 358/475 |
| 2012/0053891 A1 * | 3/2012 | Abbott, III | ............ | G01B 5/0004 702/173 |
| 2013/0098109 A1 * | 4/2013 | Ohto | ............ | G01N 21/84 65/29.14 |
| 2014/0102144 A1 * | 4/2014 | Yamanaka | ............ | C03B 18/02 428/220 |
| 2015/0310448 A1 * | 10/2015 | Vilain | ............ | G06Q 20/145 705/26.61 |
| 2015/0352794 A1 * | 12/2015 | Nguyen | ............ | B29C 64/393 700/98 |
| 2016/0052818 A1 * | 2/2016 | Golyatin | ............ | C03B 17/064 65/195 |
| 2018/0308971 A1 * | 10/2018 | Walecki | ............ | H01L 22/14 |
| 2019/0120613 A1 * | 4/2019 | Lim | ............ | G01B 21/20 |
| 2020/0326183 A1 * | 10/2020 | Kato | ............ | G01B 11/002 |
| 2022/0105600 A1 * | 4/2022 | Kurita | ............ | B24B 49/12 |

FOREIGN PATENT DOCUMENTS

| | | | | |
|---|---|---|---|---|
| CN | 102435162 A | | 5/2012 | |
| CN | 102557397 B | * | 12/2015 | ............ C03B 17/064 |
| CN | 107388669 A | * | 11/2017 | ............ F25C 1/12 |
| CN | 110294398 B | * | 9/2020 | ............ B66B 29/00 |
| CN | 113478915 A | * | 10/2021 | ............ B31B 70/64 |
| JP | 2000-028441 A | | 1/2000 | |
| JP | 2005288459 A | | 10/2005 | |
| JP | 2010-504273 A | | 2/2010 | |
| JP | 2011-513727 A | | 4/2011 | |
| JP | 2012-047745 A | | 3/2012 | |
| JP | 2013-071888 A | | 4/2013 | |
| JP | 2014-089111 A | | 5/2014 | |
| JP | 2015-537311 A | | 12/2015 | |
| KR | 20050043368 A | * | 5/2005 | ............ G06F 19/00 |
| KR | 10-2012-0020090 A | | 3/2012 | |
| KR | 101813983 B1 | * | 1/2018 | ............ G06Q 50/04 |
| KR | 10-1900101 B1 | | 9/2018 | |
| WO | 2007/010875 A1 | | 1/2007 | |
| WO | 2009108302 A1 | | 9/2009 | |
| WO | WO-2016115311 A1 | * | 7/2016 | ............ B32B 17/061 |

OTHER PUBLICATIONS

Chinese Patent Application No. 201780031959.3, Office Action dated Jun. 25, 2021, 5 pages (English Translation Only), Chinese Patent Office.
International Search Report and Written Opinion of the International Searching Authority; PCT/KR2017/005342; dated Aug. 30, 2017; 8 Pages; Korean Patent Office.
Japanese Patent Application No. 2018-561209 Office Action dated Apr. 21, 2021, 6 pages (3 pages of English Translation and 3 pages of Original Document); Japanese Patent Office.
Korean Patent Application No. 10-2016-0063048, Notice of Allowance, dated Dec. 14, 2022, 5 pages (3 pages of English Translation and 2 pages of Original Copy); Korean Patent Office.

* cited by examiner

1mm Bow(U-shape) Initial Shape    Stress Measurement    present disclosure (modeling)    conventional (measured)

[Fig. 5]

METHOD OF PREDICTING GRAVITY-FREE SHAPE OF GLASS SHEET AND METHOD OF MANAGING QUALITY OF GLASS SHEET BASED ON GRAVITY-FREE SHAPE

TECHNICAL FIELD

This application claims the benefit of priority under 35 U.S.C. § 365 of International Patent Application Serial No. PCT/KR2017/005342 filed on May 23, 2017, designating the United States of America, which in turn claims the benefit of priority to Korean Patent Application Serial No. 10-2016-0063048 filed on May 23, 2016, the content of each are relied upon and incorporated herein by reference in its entirety.

The present disclosure generally relates to a method of predicting the gravity-free shape of a glass sheet and a method of managing the quality of a glass sheet based on the predicted gravity-free shape of the glass sheet. More particularly, the present disclosure relates to a method of predicting the gravity-free shape of a glass sheet using stress in the glass sheet and a method of managing the quality of a glass sheet based on the predicted gravity-free shape of the glass sheet.

BACKGROUND ART

The shape of a glass sheet is a key quality indicator, in which warp data, influenced by gravity, has been used as a major indicator in evaluation of the quality of glass sheets to date. The term "warp" means the shape of a glass sheet laid on a frictionless surface, i.e. the shape of the glass sheet when subjected to gravity. However, due to increases in the production of premium liquid crystal display (LCD) devices having high definition, the necessity of evaluating the gravity-free shape, i.e. the original shape of a glass sheet, is increasing.

FIG. 1 schematically illustrates a prior-art method of measuring the gravity-free shape of a glass sheet.

The gravity-free shape of a glass sheet is an indicator illustrating the original shape of the glass sheet. The gravity-free shape has been recognized as being influential in the process of producing glass sheets and the process of fabricating liquid crystal display (LCD) devices. However, the gravity-free shape of glass sheets has been difficult to monitor and evaluate due to the relatively difficult measuring method thereof and other restrictions. In this regard, conventional equipment used for measuring the gravity-free shape of a glass sheet cannot measure glass sheets having relatively large sizes. Currently, a glass sheet that is too large for measurement by conventional equipment is cut into two or more pieces for measurement and the measurements of the individual pieces are then stitched together to obtain the gravity free shape of the entire sheet. In addition, the result of measurement is only used as a reference since it is difficult to verify the time and accuracy of the measurement.

The information disclosed in the Background section is only provided for a better understanding of the background and should not be taken as an acknowledgment or any form of suggestion that this information forms prior-art that would already be known to a person skilled in the art.

DISCLOSURE OF INVENTION

Technical Problem

Various aspects of the present disclosure are intended to overcome the limitations of prior-art methods of measuring a gravity-free shape.

Solution to Problem

According to an aspect, provided is a method of predicting a gravity-free shape of a glass sheet. The method may include: a) determining an initial shape of a glass sheet, the initial shape of the glass sheet comprising a one-dimensional shape which the glass sheet has when the glass sheet is formed; b) determining stress values applied to the glass sheet at a plurality of locations when the glass sheet is flattened; c) generating a glass sheet model having the same initial shape and to which the same stress values are applied; and d) predicting a shape which the glass sheet model will have when the same stress values are removed, as a gravity-free shape of the glass sheet.

According to another aspect, provided is a method of managing quality of a glass sheet based on a gravity-free shape. The method may include: producing glass sheets; constructing a database of gravity-free shapes of glass sheets as predicted by the above-described method; supplying the glass sheets to purchasers; collecting information on defects of the glass sheets and determining reasons for the defects; and when defective glass sheets supplied to a specific purchaser of the purchasers turn out to be caused by a specific gravity-free shape, stopping supply of glass sheets with the specific gravity-free shape to the specific purchaser.

Advantageous Effects of Invention

As set forth above, the technology of predicting a gravity-free shape developed according to the present disclosure can predict the shape of a large glass sheet and the shape of a thin glass sheet that are relatively difficult to measure using prior-art equipment. In addition, the technology for predicting a gravity-free shape can be used as a reference for judgment since the gravity-free shape of entire glass sheets can be predicted in a relatively short time.

The methods and apparatuses of the present disclosure have other features and advantages that will be apparent from or that are set forth in greater detail in the accompanying drawings which are incorporated herein, and in the following Detailed Description, which together serve to explain certain principles of the present disclosure.

BEST MODE FOR CARRYING OUT THE INVENTION

Figure 1:
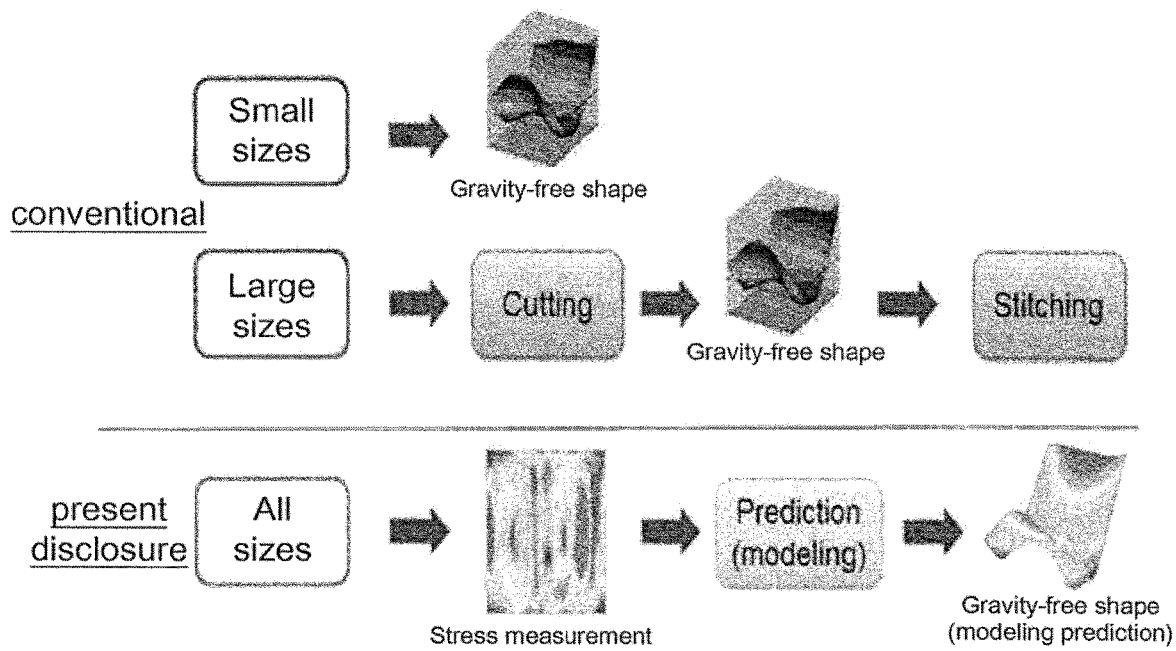
FIG. 1 schematically illustrates a prior-art method of measuring the gravity-free shape of a glass sheet.

Hereinafter, reference will be made to exemplary embodiments of the present disclosure in detail, examples of which are illustrated in the accompanying drawings and described below, so that a person skilled in the art to which the present disclosure relates could easily put the present disclosure into practice.

Throughout this document, reference should be made to the drawings, in which the same reference numerals and symbols will be used throughout to designate the same or like components. In the following description, detailed descriptions of known functions and components incorporated herein will be omitted in the case that the subject matter of the present disclosure is rendered unclear by the inclusion thereof.

The present disclosure has been conceptualized considering the fact that two-dimensional (2D) stress acting on a glass sheet is measured after the glass sheet is flattened. The present disclosure proposes a method able to determine and verify the gravity-free shape of all glass sheets using 2D stress data in a rapid, easy, and convenient manner. The 2D stress of a glass sheet is obtained by measuring stress after flattening. Since external force applied during the flattening of the glass sheet having the gravity-free shape is reflected in the 2D stress of the glass sheet, it is possible to predict the gravity-free shape by converting the 2D stress.

Figure 2:
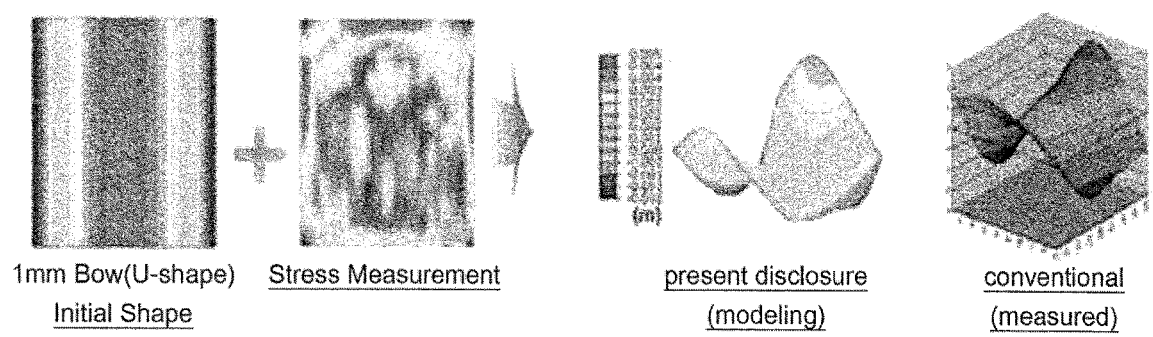
FIG. 2 schematically illustrates a method of predicting the gravity-free shape of a glass sheet according to an exemplary embodiment.

FIG. 2 schematically illustrates a method of predicting the gravity-free shape of a glass sheet according to an exemplary embodiment.

A gravity-free shape can be simply obtained by adding stress-induced deformation to the initial shape. Formula 1 expresses the configuration of the gravity-free shape as described above.

[Math. 1]

$$\text{Gravity-free shape} = \text{Initial shape} + \text{Stress-induced shape} \quad (1)$$

A process of predicting a gravity-free shape based on Formula 1 is illustrated in FIG. 2.

Specifically, first, the initial shape of a glass sheet including a one-dimensional (1D) shape that the glass sheet has when the glass sheet is formed is determined. Afterwards, stress values applied to a plurality of locations of the glass sheet when the glass sheet is flattened are measured. Thereafter, a glass sheet model which has the initial shape and to which the stress values are applied is generated. Finally, a shape that the glass sheet model will have when the stress values are removed is predicted as a gravity-free shape of the glass sheet.

Figure 3:
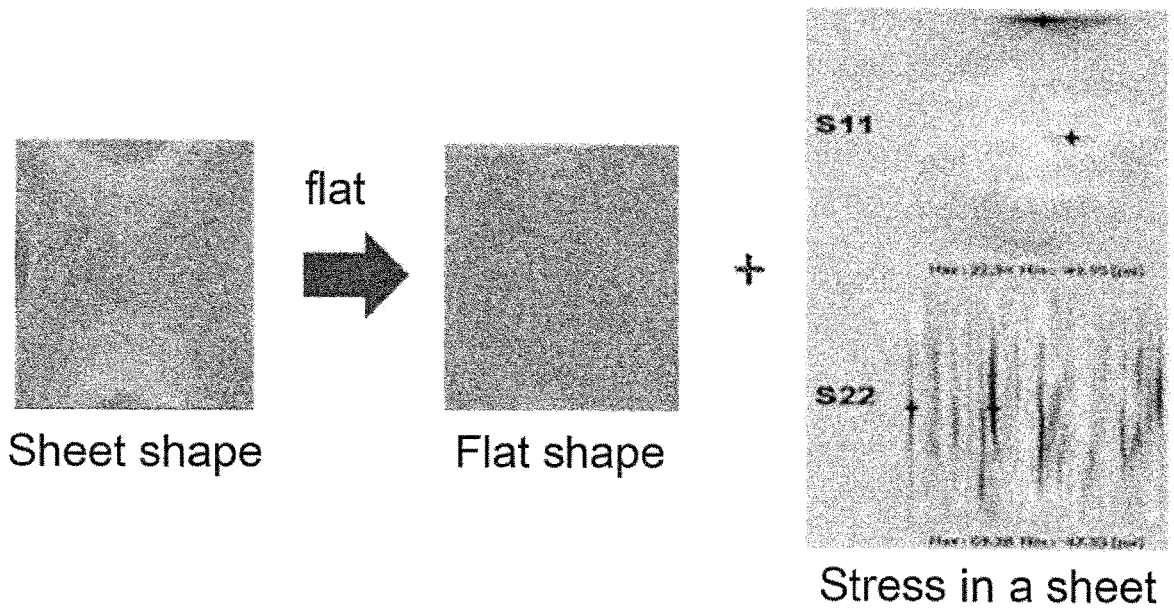
FIG. 3 illustrates the concept of a shape expressed as stress when a glass sheet is flattened.

FIG. 3 illustrates the concept of a shape expressed as stress when a glass sheet is flattened.

Since stress acting on a glass sheet is measured when the sheet is flattened, the overall shape of the glass sheet is flat, and the entirety of stress created during the flattening is included in stress measurement data. Values of stress applied to a plurality of locations of the glass sheet when the glass sheet is flattened are measured. When a shape from which stress is eliminated is determined, the shape will be similar to a gravity-free shape. The gravity-free shape is the shape of the glass sheet when the glass sheet is free of gravity. To forcibly flatten the glass sheet, an amount of force for flattening the glass sheet is applied to the glass sheet. This force consequently appears as stress on the glass sheet. That is, the sheet is flattened when measuring stress, since stress appears again when the deformed shape is flattened. In this regard, it is possible to flatten the sheet by performing suction by placing the sheet, for example, on an air table.

Figure 4:
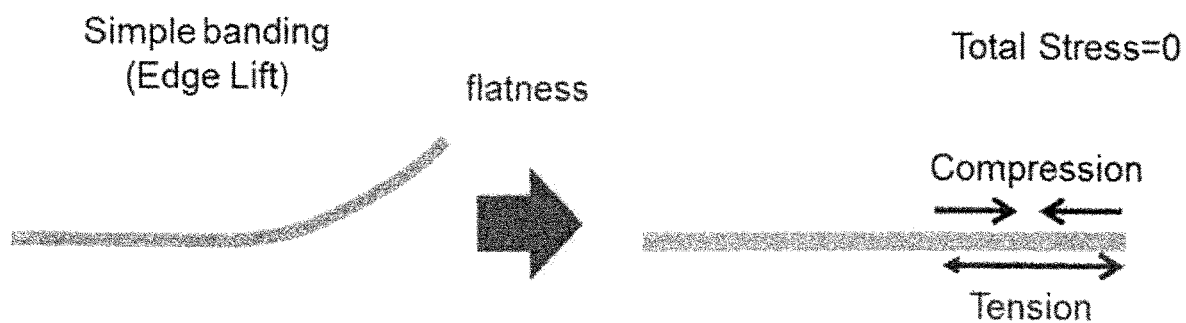
FIG. 4 illustrates the concept of a shape not expressed as stress when a glass sheet is flattened.

FIG. 4 illustrates the concept of a shape not expressed as stress when a glass sheet is flattened.

A one-dimensional shape is not expressed as stress. For example, when a cylindrical shape is flattened, opposing types of stress are formed on the top surface and the bottom surface. Thus, the resultant value of stress is measured as zero (0) in a glass sheet in which stress is measured by allowing light to pass through the glass sheet. The one-dimensional shape hardly appears in reality but may be formed at the initial stage. Thus, it is possible to predict a final gravity-free shape by setting an initial shape and adding deformation induced by positive (+) stress to the initial shape. Thus, it is possible to obtain the gravity-free shape in a simple manner by defining, as an initial shape, a simple shape not expressed as stress and adding a shape expressed as stress to the initial shape. Since a macroscopic shape is important for the gravity-free shape, a microscopic shape may be disregarded when determining the initial shape.

A U-type cylindrical shape defined as an initial shape in FIG. 2 is a component of a gravity-free shape not predicted as stress.

The shape not expressed as stress is mostly formed by simple bending, such as an edge lift or a corner lift, and substantially no complicated shape that is difficult to predict is formed. Since simple bending is not expressed as stress and an insignificant change in the shape is not expressed as stress due to the limited definition of measurement, the simple bending of an edge or a corner obtained through warp measurement may be reflected on the initial shape as required. However, this shape may not be included since this shape is a microscopic shape that does not have any significant effect on the determination of the gravity-free shape. The U-type cylindrical shape may vary depending on the circumstances of a glass sheet manufacturing system (e.g. a fusion drawing machine 140 in FIG. 5 and FIG. 6). For the U-type cylindrical shape, shape data measured by, for example, a shape measuring system (e.g. a position sensor in FIG. 6) of the glass sheet manufacturing system may be used.

Figure 5:
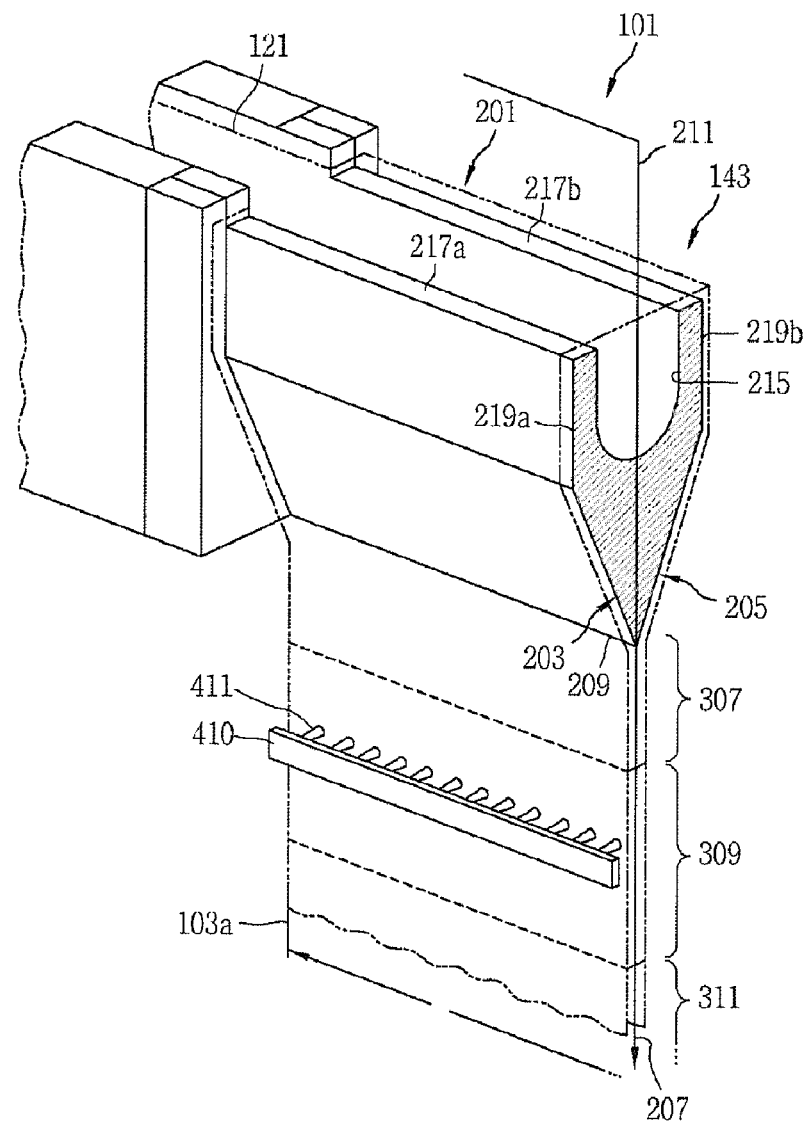
FIG. 5 and FIG. 6 schematically illustrate a method of predicting the initial shape of a glass sheet.
Figure 6:
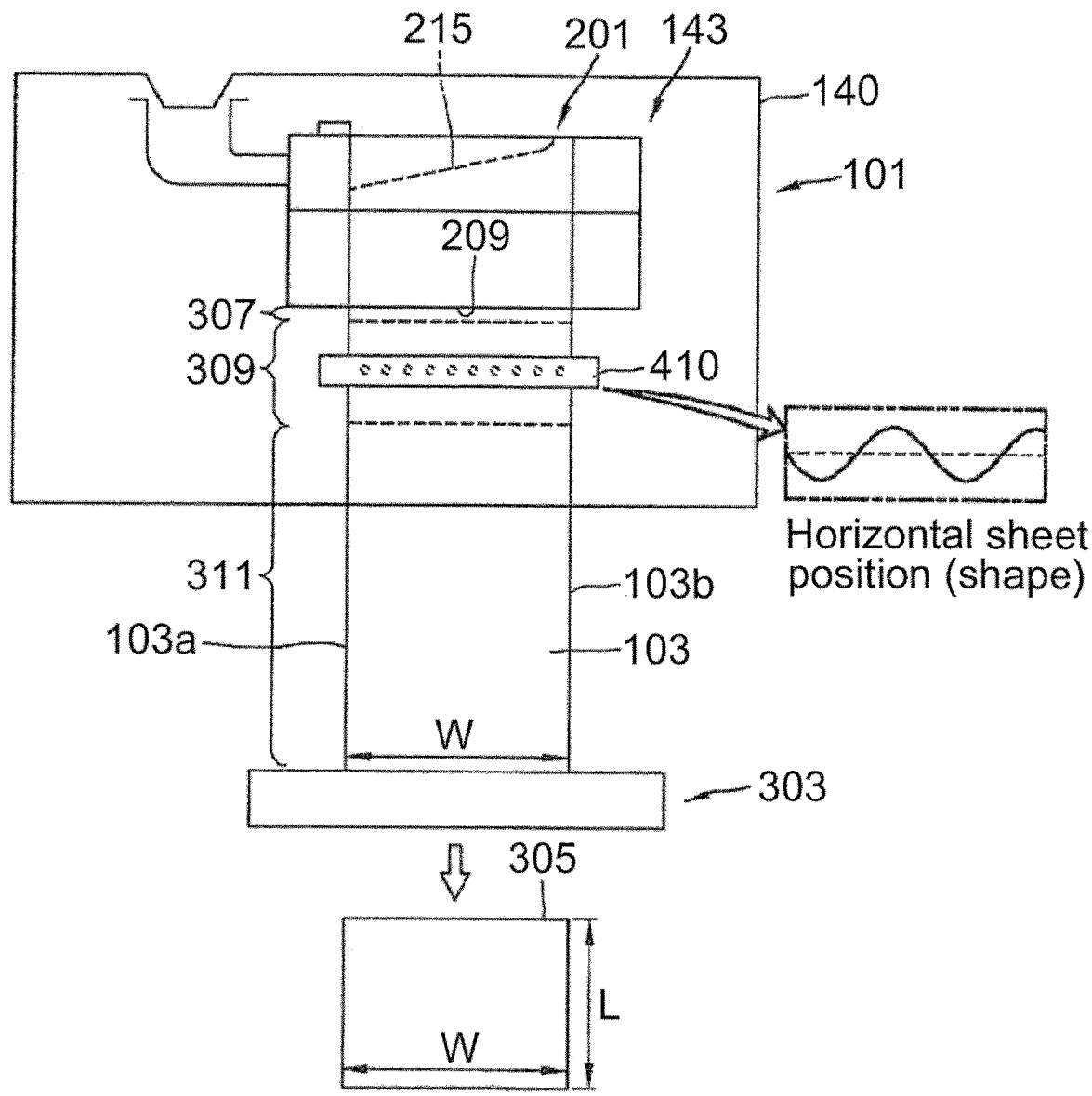

FIG. 5 and FIG. 6 schematically illustrate a method of predicting the initial shape of a glass sheet.

An apparatus can be provided for separating a glass ribbon into glass sheets. FIG. 5 and FIG. 6 schematically illustrate a fusion drawing apparatus 101. However, the glass sheet according to the present disclosure is not limited to a glass sheet manufactured using a fusion drawing process. For example, the glass sheet according to the present disclosure may be manufactured using a variety of processes, such as a down-drawing process, an up-drawing process, a float process, and the like.

The fusion drawing apparatus 101 includes the fusion drawing machine 140. The fusion drawing machine 140 includes a forming vessel 143. The forming vessel 143 is formed from a refractory material and is designed to allow a glass ribbon 103 to be formed.

As illustrated in FIG. 5 and FIG. 6, the forming vessel 143 includes a forming wedge 201. The forming wedge 201 includes a pair of downwardly-inclined forming surface portions 203 and 205. The pair of forming surface portions 203 and 205 converge in a drawing direction 207 to form a root 209. A drawing plane 211 extends through the root 209. The glass ribbon 103 may be drawn in the drawing direction 207 along the drawing plane 211. As illustrated, the drawing plane 211 may bisect the root 209 although the drawing plane 211 may extend at other orientations with respect to the root 209.

Once the edges 103a and 103b of the glass ribbon 103 are formed, the width "W" of the glass ribbon 103 is defined as being between the edges 103a and 103b in a direction substantially perpendicular to the drawing direction 207.

The fusion drawing apparatus 101 may further include a cutting device 303 allowing the glass ribbon 103 to be cut into distinct glass sheets 305. The glass sheets 305 may be subdivided into individual glass sheets to be incorporated into various display devices, such as a liquid crystal display (LCD).

Molten glass can flow into a trough 215 of the forming vessel 143. The molten glass 121 can then simultaneously flow over corresponding weirs 217a and 217b and downwardly over the outer surfaces 219a and 219b of the corresponding weirs 217a and 217b. Respective streams of molten glass then flow along the downwardly-inclined forming surface portions 203 and 205 to the root 209, where the flows converge and fuse into the glass ribbon 103. The glass ribbon 103 is then drawn off the root 209 in the drawing plane 211 in the drawing direction 207.

The glass ribbon 103 is drawn from the root 209 in the drawing direction 207 of the drawing plane 211 from a viscous zone 307 to a setting zone 309. In the setting zone 309, the glass ribbon 103 is set from a viscous state to an elastic state having a desired cross-sectional profile. The glass ribbon 103 is then drawn from the setting zone 309 to an elastic zone 311. In the elastic zone 311, the profile of the glass ribbon 103 is frozen as a characteristic of the glass ribbon. While the set glass ribbon may be flexed away from this configuration, internal stress can cause the glass ribbon to bias back to the original set profile.

The initial shape of the glass sheet is determined using a shape-measuring part 410, more particularly, by sensing the glass ribbon at a plurality of locations along the width "W" perpendicular to the drawing direction 207 in the drawing process. The shape-measuring part 410 may include a plurality of laser position sensors or a plurality of ultrasonic position sensors 411. The position sensors 411 may be arranged at regular distances or different distances. Since the shape in the setting zone 309 or the elastic zone 311 remains as the actual shape of the glass sheet, the shape-measuring part 410 may be disposed in the setting zone 309 or the elastic zone 311. External force similar to noise may influence the shape of the glass ribbon in the elastic zone, and the shape measured in the elastic zone may differ from the shape measured in the setting zone. Since such a temporary shape is recovered without remaining as a final shape, it may be preferable that the shape-measuring part 410 is disposed in the setting zone 309. However, the present disclosure is not limited thereto.

Figure 7:
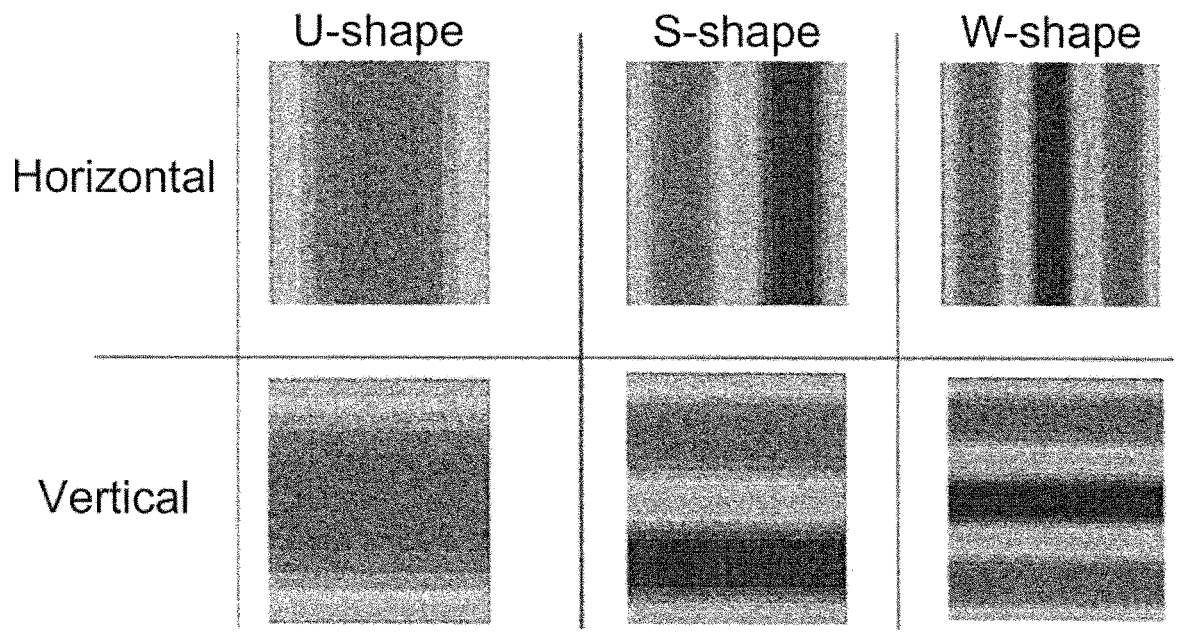
FIG. 7 illustrates a variety of examples of the initial shape of the glass sheet measured using the method illustrated in FIG. 5 and FIG. 6.

FIG. 7 illustrates a variety of examples of the initial shape of the glass sheet measured using the method illustrated in FIG. 5 and FIG. 6.

FIG. 7 illustrates measurements of horizontal bowing within the glass sheet manufacturing system (e.g. the fusion drawing machine) as an example of an initial shape. The initial shapes can be set based on the bowing for the respective glass sheet manufacturing systems. A variety of shapes as illustrated in FIG. 7 may be created. The shapes are mainly a U-type shape, an S-type shape, and a W-type shape. For example, in the fusion drawing machine, the U-type shape is mainly created in a stabilized process to which the current flat ribbon process is applied.

Figure 8:
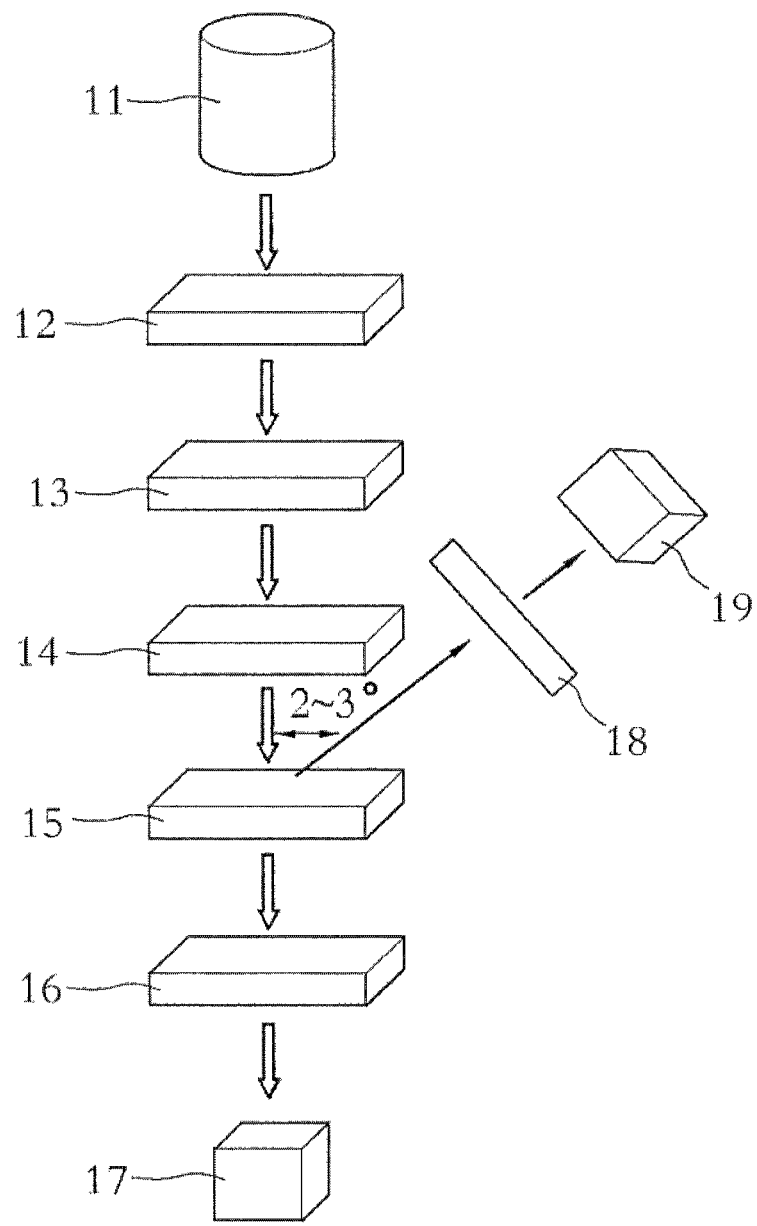
FIG. 8 schematically illustrates a system for measuring retardation values of light passing through a glass substrate.

FIG. 8 schematically illustrates a system for measuring the retardation of light passing through a glass substrate.

It will be apparent to a person skilled in the art that the retardation of light according to the present embodiment is not required to be measured using only the system illustrated in FIG. 8. That is, FIG. 8 merely illustrates an exemplary method for measuring the retardation of light through a glass sheet, and the retardation of light may be measured using other known methods.

Polarized light is radiated onto a flattened glass sheet, and then retardation values and azimuth angles of polarized light that has passed through the flattened glass sheet are measured. Stress values may be converted from the measured retardation values and azimuth angles.

First, birefringence data of the glass sheet (i.e., retardation values and azimuth angles of light: θ) are obtained. Specifically, light emitted by a light source 11 passes through a 45° linear polarizer 12 and then a 0° photo elasticity modulator 13. During passage through the 0° photo elasticity modulator 13, the phase of the light changes depending on the frequency of light. The phase-changed light passes through a glass sample 14, during which the polarization of the light is changed, depending on the internal stress of the glass sample 14. One portion of the polarization-changed light passes through a mirror 15 and a −45° linear polarizer 16 before the luminance thereof is measured by a first luminance sensor (photodiode) 17. The other portion of the polarization-changed light is reflected from the mirror 15 to pass through a 0° linear polarizer 18 before the luminance thereof is measured by a second luminance sensor (photodiode) 19. The retardation and azimuthal angle of the light are calculated from the measured luminance values using Mueller matrices.

Formula 2 represents the relationship between the retardation value of light and principal stress. A difference in principal stress is calculated using Formula 2:

[Math. 2]

$$\sigma_1 - \sigma_2 (psi) = \frac{\text{Retardance (nm)}}{[K * \text{thickness(cm)} * SOC(\text{nm/cm}/psi)]} \quad (2)$$

Subsequently, a stress component τxy is calculated using Formula 3:

[Math. 3]

$$\tau_{xy} = \frac{1}{2}(\sigma_1 - \sigma_2)\sin(2\theta) \quad (3)$$

Stress components $\sigma_{xx}$ and $\sigma_{yy}$ are calculated using $\tau_{xy}$ from a partial differential equation of Formula 4:

[Math. 4]

$$\frac{\partial \sigma_{xx}}{\partial x} + \frac{\partial \tau_{xy}}{\partial y} = 0, \frac{\partial \sigma_{yy}}{\partial y} + \frac{\partial \tau_{xy}}{\partial x} = 0 \quad (4)$$

Figure 9:
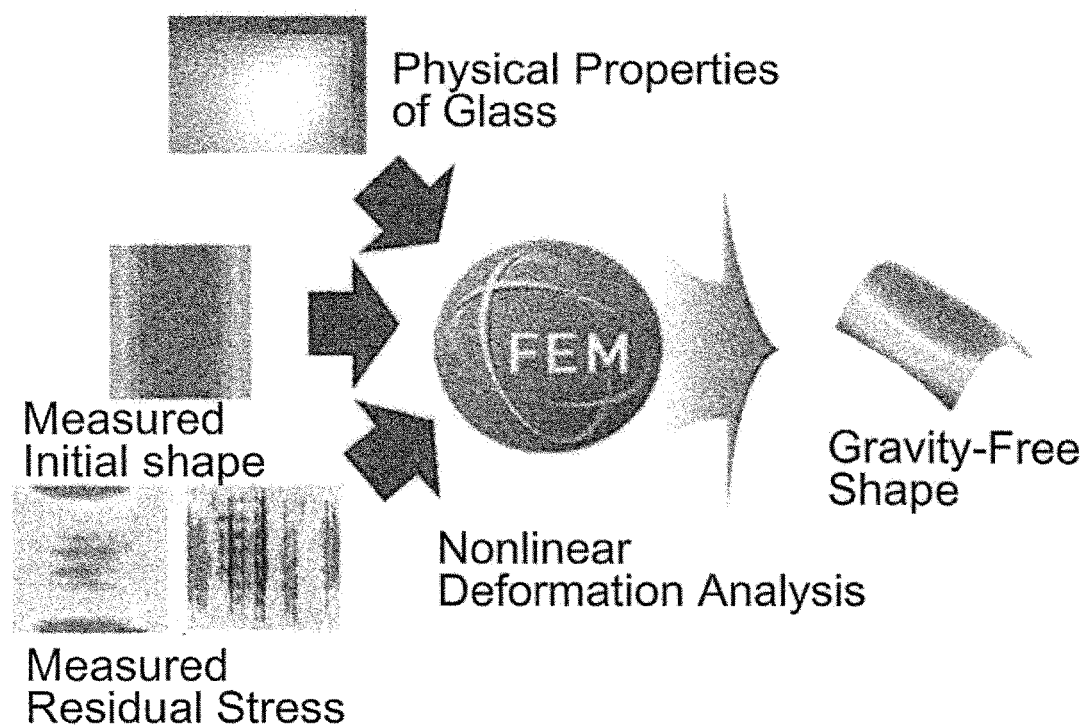
FIG. 9 and FIG. 10 schematically illustrate processes of executing the method of predicting the gravity-free shape of a glass sheet illustrated in FIG. 2, using an FEM nonlinear prediction algorithm.
Figure 10:
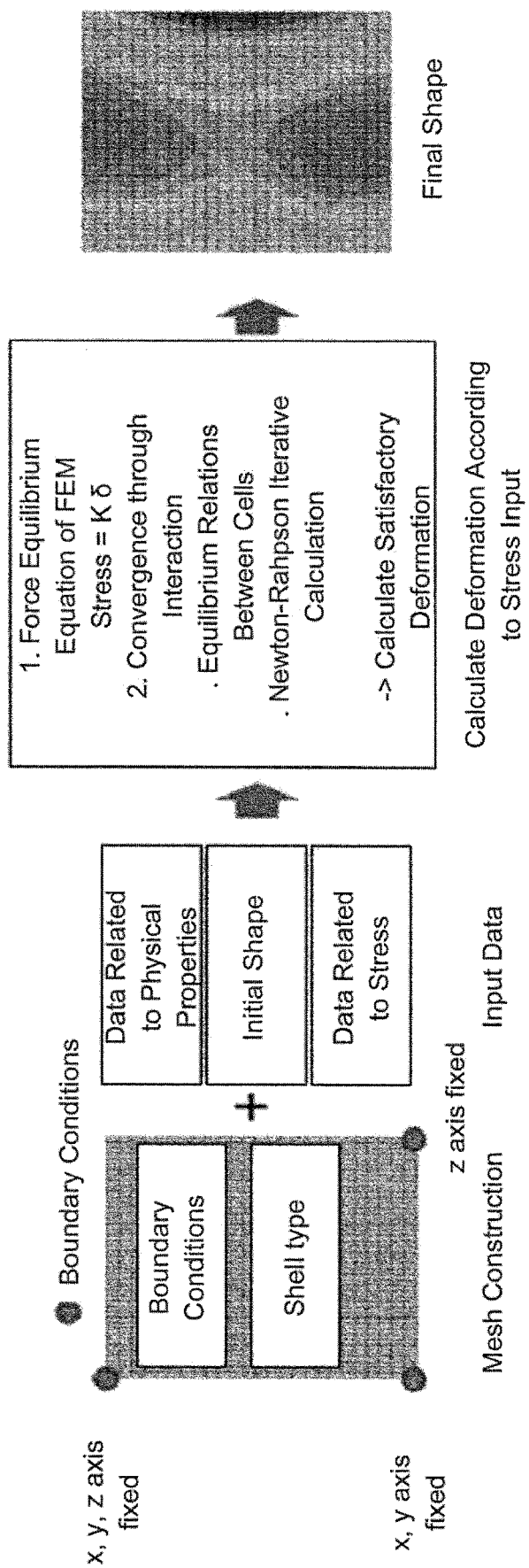

FIG. 9 and FIG. 10 schematically illustrates processes of executing the method of predicting the gravity-free shape of a glass sheet illustrated in FIG. 2, using a nonlinear prediction algorithm of the finite element method (FEM).

Describing the prediction process in FIG. 2 in greater detail, as illustrated in FIG. 9 and FIG. 10, the gravity-free shape can be finally predicted by applying data related to basic physical properties, the initial shape, and stress in the glass sheet to a nonlinear deformation analysis algorithm of the FEM.

When predicting the gravity-free shape, the nonlinear deformation analysis algorithm of the FEM may diverge instead of converging under specific conditions. Thus, it is possible to enhance predictability by adding a variety of convergence increasing algorithms to the prediction algorithm.

As described above, it is possible to predict the gravity-free shape through the FEM analysis based on the nonlinear structure using the stress data and the initial shape.

The prediction of the gravity-free shape was performed using Abaqus, a commercially-available software suite. As illustrated in FIG. 10, for example, a shell-type element may be used in the FEM analysis. A mesh is constructed, and a degree of deformation is calculated by inputting data regarding physical properties (e.g. elastic modulus, Poisson ratio, coefficient of thermal expansion, density, and the like), an initial shape, and stress to an FEM nonlinear deformation analysis algorithm. As a boundary condition, three points may be fixed in order to prevent rotation. In the calculation of deformation, a formula: Stress=K×Strain is used. In this formula, K is a rigidity factor that varies depending on shapes. The analysis is repeatedly performed until the analysis result satisfies convergence criteria. Respective shells converge when equilibrium relations are satisfied, and the Newton-Raphson iteration method can be used.

When many glass sheets have been analyzed using the developed system, it is possible to analyze and define a variety of gravity-free shapes.

It is possible to manage the quality of glass sheets supplied using the predicted gravity-free shape.

In this regard, before glass sheets are supplied to purchasers, the gravity-free shapes thereof are predicted and a database of the gravity-free shapes is constructed. Afterwards, information on defective products is collected from the respective purchasers. Reasons for defects are then determined for the respective purchasers. When defective glass sheets supplied to a specific purchaser turn out to be caused by a specific gravity-free shape, glass sheet management is performed such that the supply of glass sheets having the specific gravity-free shape to the specific purchaser is stopped.

For example, when it is determined that defects have occurred in glass sheets supplied to a specific purchaser due to a cylindrical gravity-free shape, gravity-free shapes in the entire supply line are measured and determined, and then, glass sheet management is performed such that the supply of glass sheets having the cylindrical gravity-free shape is stopped.

For example, the method of managing the quality of a glass sheet may be used for analyzing main issues in the process of fabricating LCD devices. When defects turn out to be caused by a gravity-free shape of glass sheets which has been supplied, all glass sheets to be supplied may be inspected and the inspection results may be used for judgment.

In addition, it is possible to develop technology for automatically predicting and judging gravity-free shapes, which may be a great help for quick judgments and applications in actual processes.

The foregoing descriptions of specific exemplary embodiments of the present disclosure have been presented with respect to the drawings. They are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limited to the foregoing embodiments, but be defined by the Claims appended hereto and their equivalents.

What is claimed is:

1. A method of predicting a gravity-free shape of a glass sheet, comprising:
   determining, using a shape-measuring part that operates a plurality of sensors to measure a property of the glass sheet at a plurality of locations, an initial shape of the glass sheet during a process of forming the glass sheet based on the property measured at the plurality of locations, the initial shape of the glass sheet comprising a one-dimensional shape which the glass sheet has during the process of forming the glass sheet and prior to application of an external force as part of a flattening process;
   applying an external force to the glass sheet having the initial shape as part of the flattening process to form a flattened glass sheet;
   during application of the external force to the glass sheet as part of the flattening process, measuring stress values applied to the flattened glass sheet at the plurality of locations as a result of the application of the external force;
   generating a glass sheet model having the initial shape and to which the stress values are applied;
   predicting a shape which the glass sheet model will have after removal of the stress values, as a gravity-free shape of the glass sheet; and
   storing the gravity-free shape of the glass sheet in a database with defect information associated with the gravity-free shape to stop a supply subsequently-produced glass sheets comprising the gravity-free shape to customers based on the defect information.

2. The method of claim 1,
   wherein measuring the stress values applied to the glass sheet comprises:
   irradiating the flattened glass sheet with polarized light,
   measuring retardation values and azimuth angles of the polarized light having passed through the flattened glass sheet at the plurality of locations in the glass sheet, and
   converting the retardation values and azimuth angles to the stress values.

3. The method of claim 1, wherein
   the glass sheet is produced by a drawing process or a float process,
   determining the one-dimensional shape of the glass sheet comprises measuring a shape of a glass ribbon in the drawing process or the float process, and
   the glass sheet is cut from the glass ribbon.

4. The method of claim 3, wherein determining the one-dimensional shape of the glass sheet comprises sensing the glass ribbon at respective locations along a width of the glass ribbon perpendicular to a drawing direction in which the glass ribbon is drawn.

5. The method of claim 3, wherein the initial shape additionally reflects at least one of a local shape of a lifted corner and a local shape of a lifted edge, determined by measuring a warp of the glass sheet subjected to gravity.

6. The method of claim 1, wherein a finite element method (FEM) nonlinear prediction algorithm is used to predict the stress-induced shape and the gravity-free shape.

7. The method of claim 1, wherein the gravity-free shape of the glass sheet is predicted based on data related to properties of the glass sheet.

8. A method of managing quality of a glass sheet based on a gravity-free shape, comprising:
   producing glass sheets;
   constructing a database of gravity-free shapes of glass sheets as predicted by a method recited in claim 1;
   supplying the glass sheets to purchasers;
   collecting information on defects of the glass sheets and determining reasons for the defects; and
   responsive to defective glass sheets supplied to a specific purchaser of the purchasers turning out to be caused by a specific gravity-free shape, stopping supply of glass sheets with the specific gravity-free shape to the specific purchaser.

\* \* \* \* \*